(12) United States Patent
Hsieh

(10) Patent No.: US 12,130,680 B2
(45) Date of Patent: Oct. 29, 2024

(54) ELECTRONIC DEVICE

(71) Applicant: PEGATRON CORPORATION, Taipei (TW)

(72) Inventor: Chen-Yun Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 203 days.

(21) Appl. No.: 18/080,601

(22) Filed: Dec. 13, 2022

(65) Prior Publication Data

US 2023/0213991 A1 Jul. 6, 2023

(30) Foreign Application Priority Data

Jan. 6, 2022 (TW) ................................. 111100491

(51) Int. Cl.
*G06F 1/26* (2006.01)
*G06F 1/16* (2006.01)
*G06F 3/0354* (2013.01)

(52) U.S. Cl.
CPC ............ *G06F 1/266* (2013.01); *G06F 1/1607* (2013.01); *G06F 1/26* (2013.01); *G06F 3/03545* (2013.01); *G06F 2200/1632* (2013.01)

(58) Field of Classification Search
CPC .... G06F 1/266; G06F 1/1607; G06F 3/03545; G06F 2200/1632; G06F 1/26; G06F 1/16; G06F 3/0354
See application file for complete search history.

(56) References Cited

U.S. PATENT DOCUMENTS

| | | | |
|---|---|---|---|
| 2008/0166175 A1* | 7/2008 | Pittel | B43K 23/02 401/131 |
| 2016/0190839 A1* | 6/2016 | Otsuka | G06F 1/266 320/115 |

FOREIGN PATENT DOCUMENTS

| | | |
|---|---|---|
| CN | 102341771 | 2/2012 |
| CN | 203851172 | 9/2014 |
| CN | 210954999 | 7/2020 |
| CN | 211106631 | 7/2020 |
| TW | M343200 | 10/2008 |
| TW | 645315 | 12/2018 |
| TW | M587774 | 12/2019 |

\* cited by examiner

*Primary Examiner* — Danny Nguyen
(74) *Attorney, Agent, or Firm* — J.C. PATENTS

(57) ABSTRACT

An electronic device includes a casing having an accommodation groove with an open end and a base adjacent to the accommodation groove, a stylus whose front edge has a groove, an annular sleeve, a charging switch adjacent to the base and a pair of hooks. The base has a center column protruding along an axial direction. The stylus enters the accommodation groove from the open end. The annular sleeve is sleeved on the center column and has first and second protruding portions. The first protruding portion is located on a movement path of the stylus entering the accommodation groove from the open end until going in thoroughly. The charging switch and the accommodation groove are on different sides of the base. The second protruding portion is adapted to touch the charging switch. The hooks are located on the opposite sides of the accommodation groove and adapted to be fastened with the groove.

9 Claims, 4 Drawing Sheets

ELECTRONIC DEVICE

CROSS-REFERENCE TO RELATED APPLICATION

This application claims the priority benefit of Taiwan application serial no. 111100491, filed on Jan. 6, 2022. The entirety of the above-mentioned patent application is hereby incorporated by reference herein and made a part of this specification.

BACKGROUND

Technical Field

The disclosure relates to an electronic device, and more particularly, to an electronic device with a stylus.

Description of Related Art

FIG. 1 is a schematic diagram of a conventional stylus being inserted into a casing of an electronic device. FIG. 2 is a schematic diagram of a charging schedule being triggered after a stylus is engaged. Referring to FIG. 1 and FIG. 2 together, a stylus 110 is inserted into an electronic device 100 such as a notebook computer or a tablet computer. In the conventional design, a single-sided hook structure 120 fixes the stylus 110, and the pressure applied to the stylus 110 by the hook structure 120 allows the stylus 110 to push the latch structure 130 disposed on the other side to touch a charging switch 140, thereby triggering the charging schedule of a charging device (not shown). Such a design avoids the risk of the charging switch 140 directly touching the stylus 110 and being damaged by the stylus 110.

However, during the insertion process of the stylus 110, the stylus 110 must be inserted to a certain depth to trigger a charging mode (i.e. the latch structure 130 must touch the charging switch 140 of the charging device). If the charging switch 140 is triggered too early, a circuit board of the charging device may be over-charged, which may damage the circuit board.

SUMMARY

The disclosure provides an electronic device which prevents a charging schedule from being triggered in advance.

An electronic device of the disclosure includes a casing, a stylus, an annular sleeve, a charging switch and a pair of hooks. The casing has an accommodation groove and a base. The accommodation groove has an open end, and the base is disposed adjacent to the accommodation groove and has a center column protruding along an axial direction of the base. The stylus is adapted to enter from the open end and be accommodated in the accommodation groove, and the front edge of the stylus has a groove. The annular sleeve is sleeved on the center column and has a first protruding portion and a second protruding portion protruding from the circumferential surface of the annular sleeve. The first protruding portion is located on the movement path of the stylus entering the accommodation groove from the open end until going in thoroughly. The charging switch is disposed adjacent to the base. The charging switch and the accommodation groove are located on different sides of the base, and the second protruding portion is adapted to touch the charging switch. The hooks are located on the opposite sides of the accommodation groove and are adapted to be fastened with the groove.

In an embodiment of the disclosure, the above-mentioned stylus enters the accommodation groove from the open end and pushes the first protruding portion for driving the annular sleeve to rotate about the center column along a first direction. The second protruding portion touches and pushes the charging switch to trigger a charging schedule.

In an embodiment of the disclosure, the above-mentioned casing further includes a stopper portion located on the movement path of the first protruding portion, and the stopper portion is adapted to restrict a rotation angle of the annular sleeve.

In an embodiment of the disclosure, a top surface of the base and a bottom surface of the annular sleeve are spiral surfaces, and the top surface of the base touches the bottom surface of the annular sleeve.

In an embodiment of the disclosure, the top surface of the base and the bottom surface of the annular sleeve are in partial contact.

In an embodiment of the disclosure, when the stylus disengages from the accommodation groove from the open end, the groove on the front edge of the stylus ceases to interfere with the hooks. The annular sleeve rotates about the center column along the reverse direction of the first direction by the weight of the annular sleeve to separate the second protruding portion from the charging switch.

In an embodiment of the disclosure, the above-mentioned charging switch provides an elastic restoring force to move the second protruding portion.

In an embodiment of the disclosure, the hooks, along the axial direction, are spaced apart from an inner surface of the casing by a distance.

In an embodiment of the disclosure, the above-mentioned casing has a groove, and the groove is located below the hook disposed adjacent to the base.

Based on the above, the disclosure provides the electronic device with a novel structure. In view of conventional electronic devices, the charging schedule may be triggered too early before the stylus is inserted to a predetermined depth. In comparison, in the electronic device of the disclosure, the annular sleeve is used to replace the latch structure, and the annular sleeve rotates only when the second protruding portion of the annular sleeve touches the charging switch to trigger the charging schedule, in response to the insertion depth of the stylus. Therefore, the electronic device of the disclosure can prevent the charging switch from being triggered too early and protect the circuit board from damage due to over-charging.

DESCRIPTION OF THE EMBODIMENTS

The electronic device of the embodiment is, for example, a notebook computer or a tablet computer, but the disclosure is not limited hereto.

Figure 1:
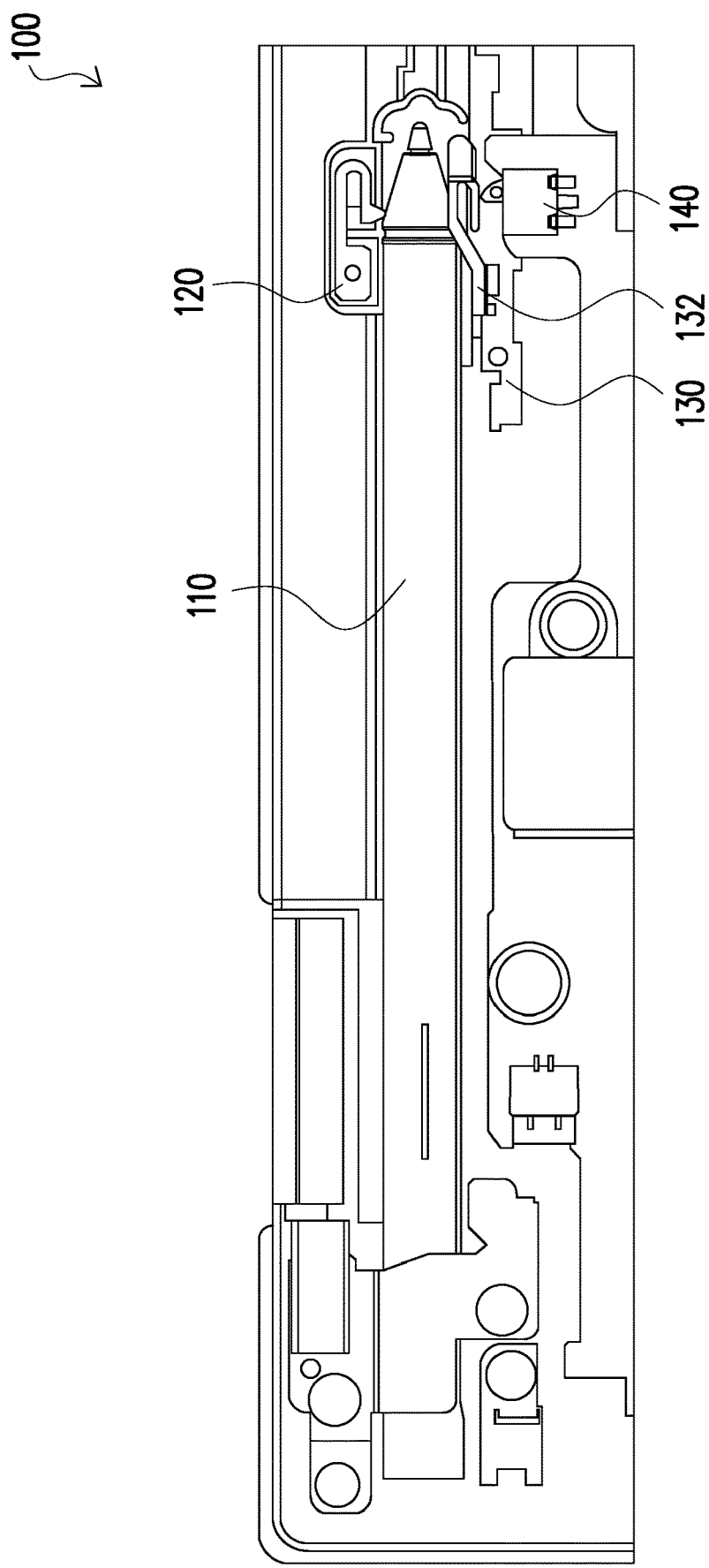
FIG. 1 is a schematic diagram of a conventional stylus being inserted into a casing of an electronic device.
Figure 2:
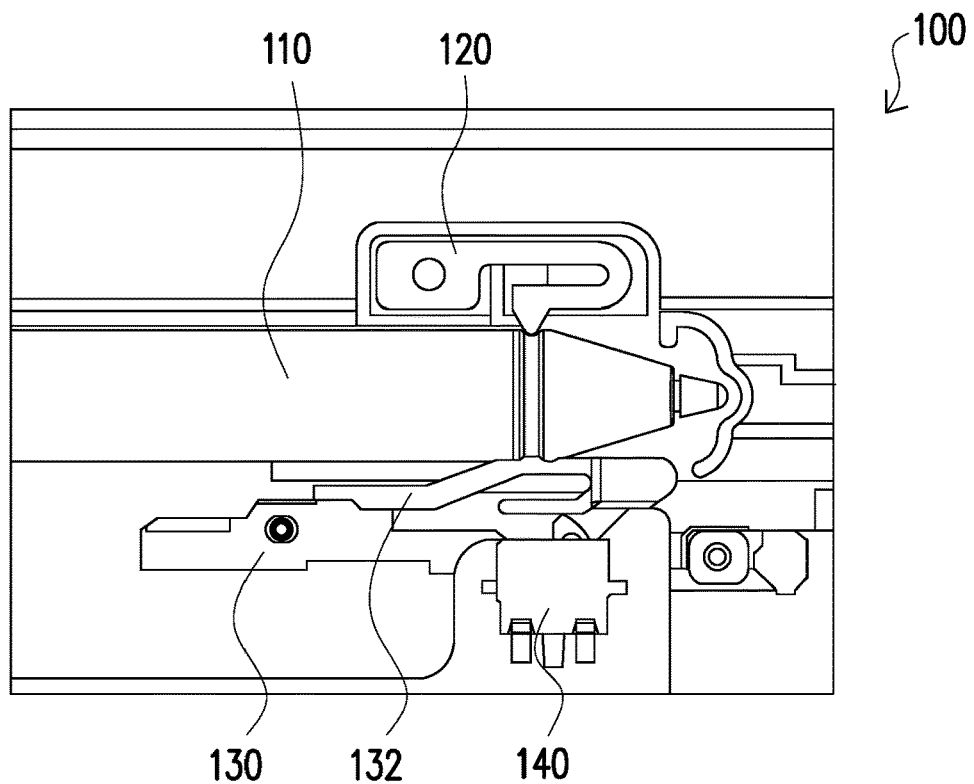
FIG. 2 is a schematic diagram of a stylus triggering a charging schedule after the stylus is fastened.
Figure 3:
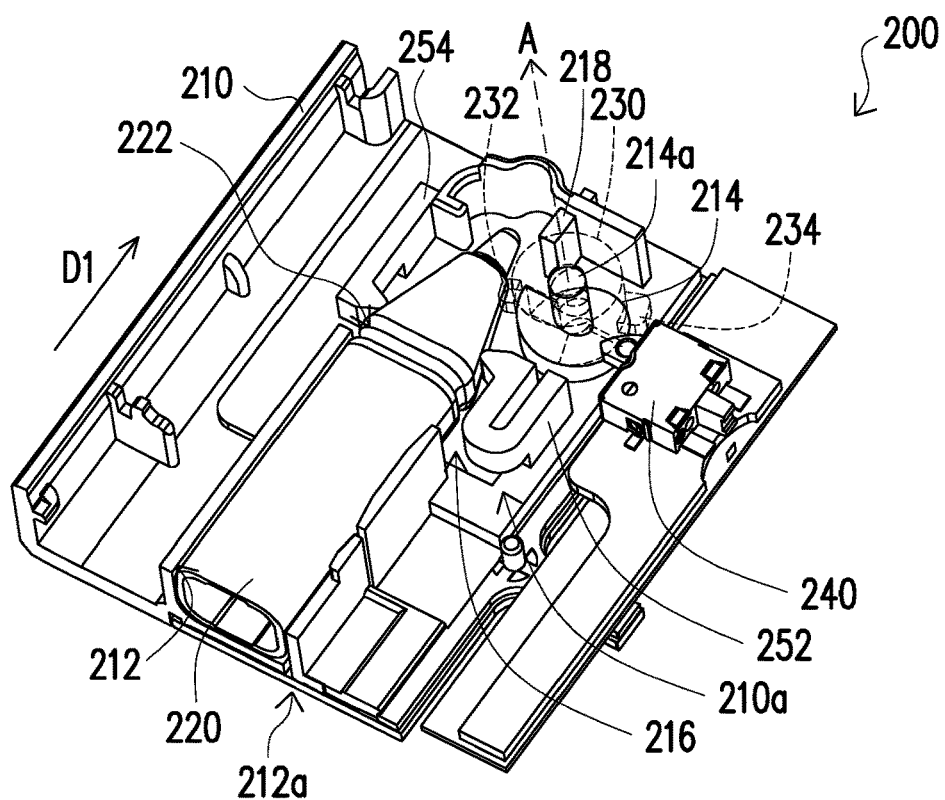
FIG. 3 is a partial perspective schematic diagram of an electronic device according to an embodiment of the disclosure.
Figure 4:
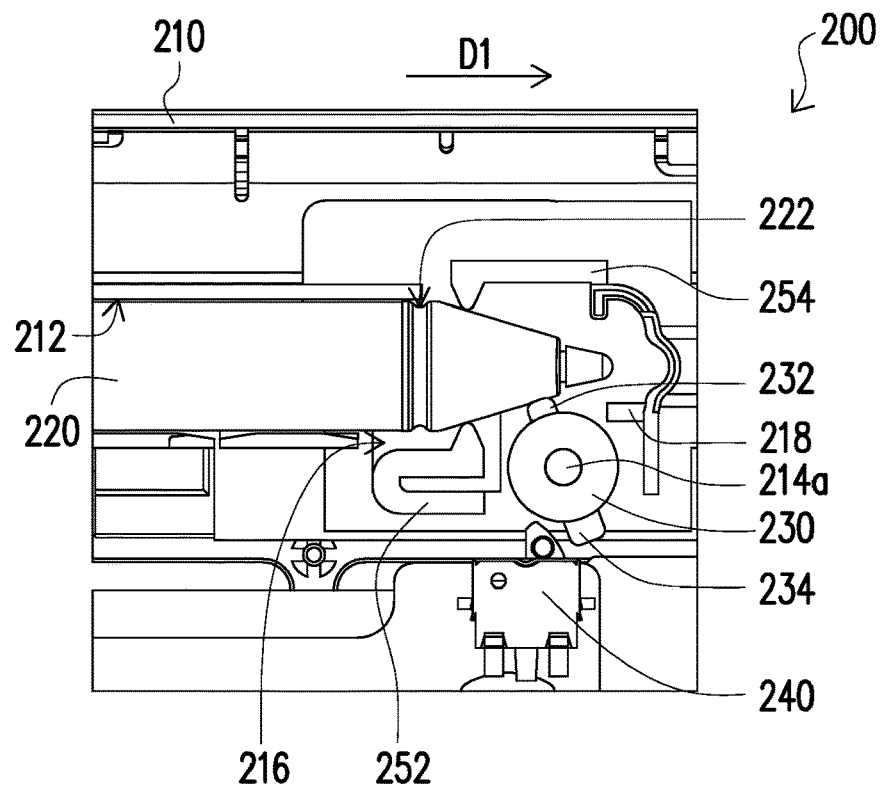
FIG. 4 is a top-view diagram of FIG. 3.
Figure 5:
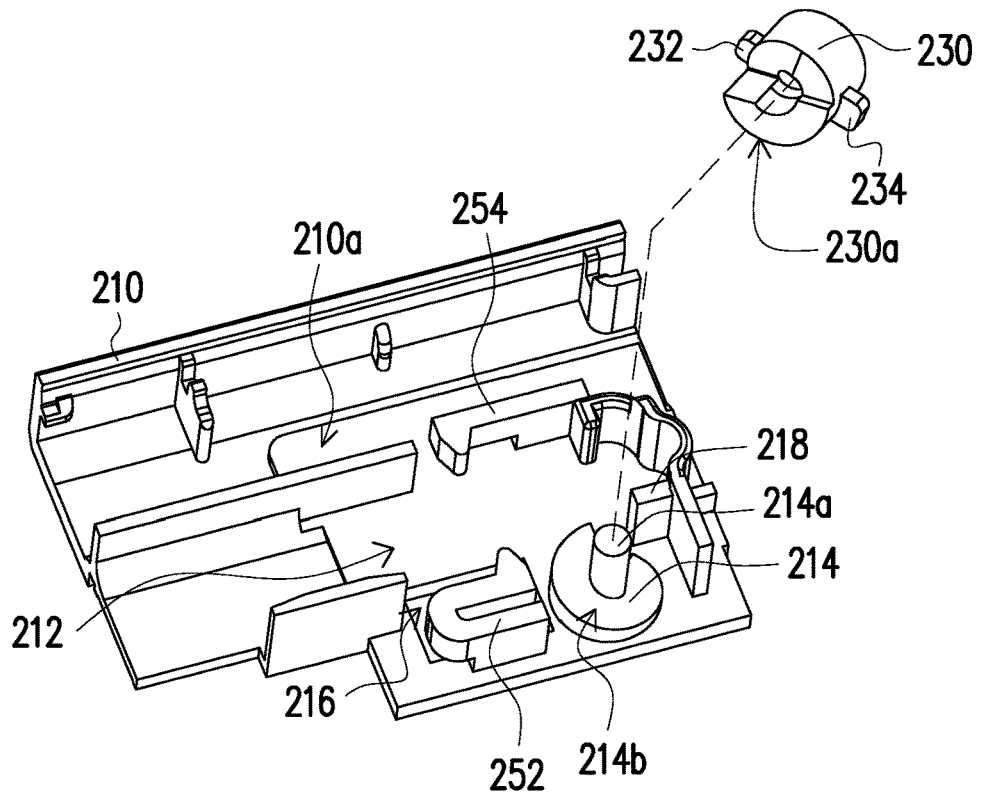
FIG. 5 is an exploded schematic diagram of an electronic device in which illustrations of a stylus and a charging switch are omitted.

FIG. 3 is a partial perspective schematic diagram of an electronic device according to an embodiment of the disclosure. FIG. 4 is a top-view diagram of FIG. 3. FIG. 5 is an exploded schematic diagram of an electronic device in which illustrations of a stylus and a charging switch are omitted.

Referring to FIG. 3, FIG. 4 and FIG. 5 together, an electronic device 200 includes a casing 210, a stylus 220, an annular sleeve 230, a charging switch 240, and a pair of hooks 252 and 254.

The casing 210 has an accommodation groove 212 and a base 214. The accommodation groove 212 has an open end 212a. The base 214 is disposed adjacent to the accommodation groove 212. The base 214 is located between the charging switch 240 and the accommodation groove 212 and has a center column 214a protruding along the axial direction A.

The stylus 220 may be accommodated in the casing 210. Specifically, when the stylus 220 is to be accommodated in the casing 210, the stylus 220 enters from the open end 212a and is accommodated in the accommodation groove 212. The direction of the stylus 220 entering the accommodation groove 212 is perpendicular to the axis A.

The annular sleeve 230 is sleeved on the center column 214a, so the annular sleeve 230 may rotate about the center column 214a. The annular sleeve 230 has a first protruding portion 232 and a second protruding portion 234 protruding from the circumferential surface of the annular sleeve 230. The first protruding portion 232 is located on the movement path of the stylus 220 entering the accommodation groove 212 from the open end 212a until going in thoroughly, and the second protruding portion 234 is adapted to touch the charging switch 240.

A groove 222 is disposed at the front edge of the stylus 220, and the hook 252 and hook 254 for fastening with the groove 222 of the stylus 220 are disposed on the opposite sides of the accommodation groove 212. The hook 252 and hook 254 may be integrally formed with the casing 210 during an injection molding manufacturing process.

Specifically, the first hook 252 is disposed on a side of the accommodation groove 212 relatively closer to the base 214 while the second hook 254 is disposed on the other side of the accommodation groove 212 relatively farther from the base 214. In addition, along the axial direction A, the first hook 252 and the second hook 254 are spaced apart from the inner surface of the casing 210 by a distance. The first hook 252 and the second hook 254 are kept at a distance away from the inner surface of the casing 210 in the axial direction A (shown in FIG. 5) Thus, it avoids the mismatch between the groove 222 and the hooks 252 and 254 caused by the friction between the inner surface of the casing 210 and the hook 252 and the hook 254 when the hook 252 and hook 254 are in use.

In addition, the casing 210 also has a groove 216, and the groove 216 is located below the first hook 252 which is disposed adjacent to the base 214. The groove 216 is formed when the casing 210 is being injection-molded.

The casing 210 further includes a stopper portion 218 located on the movement path of the first protruding portion 232. The stopper portion 218 is used to restrict the movement distance of the first protruding portion 232, which further restricts the rotation angle of the annular sleeve 230.

In the embodiment, both a top surface 214b of the base 214 and a bottom surface 230a of the annular sleeve 230 are spiral surfaces, and the top surface 214b of the base 214 touches the bottom surface 230a of the annular sleeve 230. The top surface 214b of the base 214 and the bottom surface 230a of the annular sleeve 230 may be in partial contact.

The purpose of the partial contact between the top surface 214b of the base 214 and the bottom surface 230a of the annular sleeve 230 is to reduce the friction, so that the annular sleeve 230 can smoothly rotate about the center column 214a.

Referring to FIG. 5, incidentally, the partial contact between the top surface 214b of the base 214 and the bottom surface 230a of the annular sleeve 230 may be implemented by a level difference on the bottom surface 230a of the annular sleeve 230. The height of a part of the bottom surface 230a is higher than the height of the other part of the bottom surface 230a when the annular sleeve 230 is sleeved on the center column 214a along the axial direction A. Moreover, by disposing the level difference, the supplementary effect of limiting the rotation angle of the annular sleeve 230 may be achieved.

Figure 6:
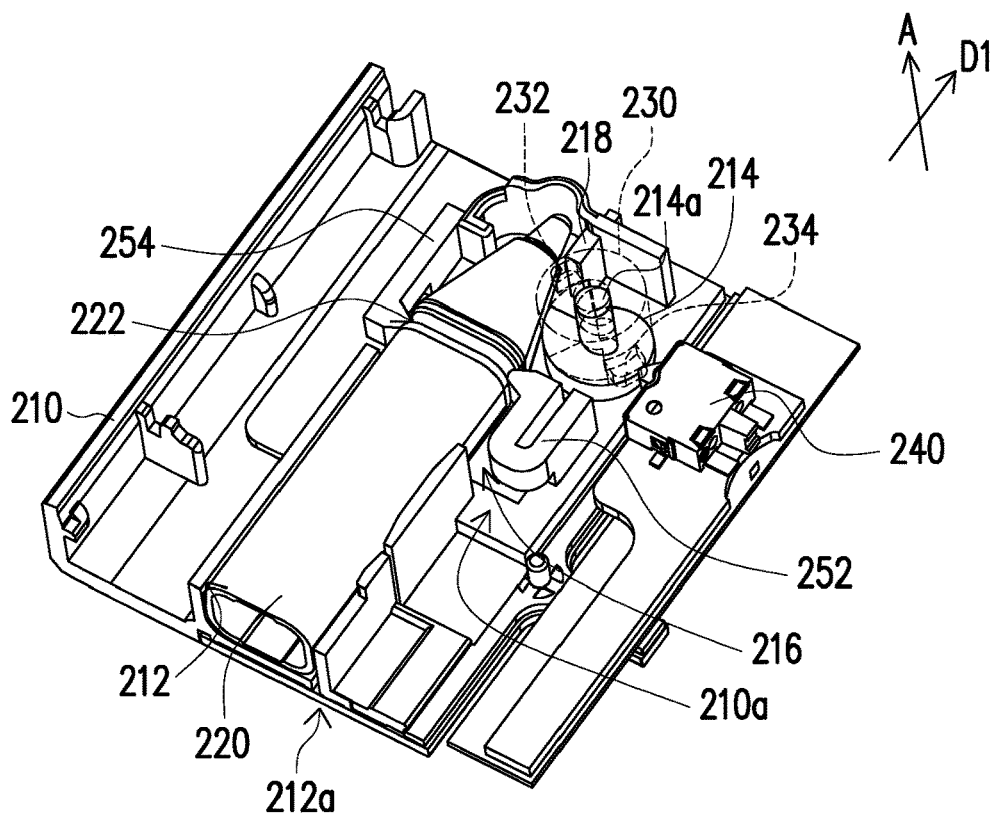
FIG. 6 is a perspective schematic diagram of a stylus touching a first protruding portion to rotate an annular sleeve.
Figure 7:
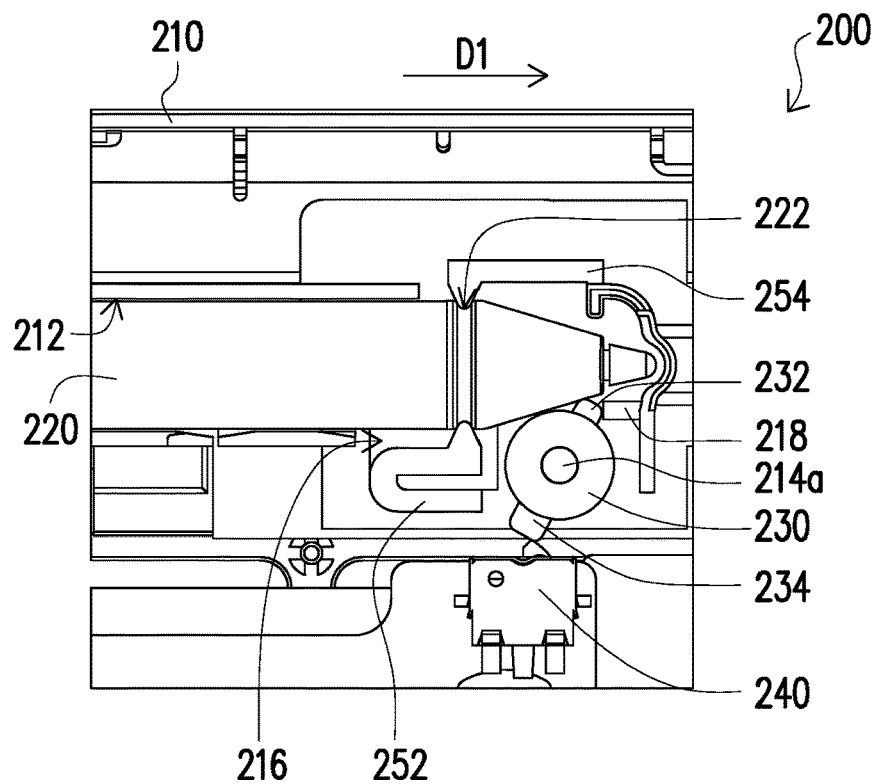
FIG. 7 is a top-view diagram of FIG. 6.

FIG. 6 is a perspective schematic diagram of a stylus touching a first protruding portion to rotate an annular sleeve, and FIG. 7 is a top-view diagram of FIG. 6. Referring to FIG. 6 and FIG. 7 together, after the stylus 220 enters the accommodation groove 212, the front edge of the stylus 220 may touch and push the first protruding portion 232 as the stylus 220 goes deeper and deeper in the accommodation groove 212 and drive the annular sleeve 230 to rotate about the center column 214a along the first direction D1 (i.e. the direction in which the stylus 220 enters the accommodation groove 212).

As the stylus 220 enters the accommodation groove 212 and reaches the specified position, the first hook 252 and the second hook 254 are fastened with the groove 222 of the stylus 220, and the first protruding portion 232 of the annular sleeve 230 touches the stopper portion 218. At this moment, the annular sleeve 230 is unable to rotate, and the second protruding portion 234 touches and pushes the charging switch 240 to trigger the charging schedule.

It should be noted that since the first hook 252 and the second hook 254 are spaced apart from an inner surface 210a of the casing 210 in the axial direction A, the movements of the first hook 252 and the second hook 254 do not interfere with the inner surface 210a of the casing 210 or generate friction when the first hook 252 and the second hook 254 are in operation.

In particular, in the electronic device 200 of the disclosure, the annular sleeve 230 having the first protruding portion 232 and the second protruding portion 234 is used to replace the latch structure 130 used in the conventional electronic device 100, so the problem of elastic fatigue occurring in an elastic arm 132 of the latch structure 130 is prevented.

In addition, since the first hook 252 and the second hook 254 are disposed on the two opposite sides of the accommodation groove 212, the first hook 252 and the second hook 254 provide a better engaging force to the stylus 220 and can prevent the stylus 220 from falling out of the casing 210 when the electronic device 200 performs a drop test. Moreover, the problem in the conventional electronic device 100 is resolved. Since in the conventional electronic device 100, the single-sided hook structure 120 has a different strength than the elastic arm 132 of the latch structure 130, the stylus 220 may not be positioned well due to the uneven force on the two sides applied by the hook structure 120 and the latch structure 130 after the stylus 220 is inserted into the accommodation groove 212. Also, in the embodiment, the first hook 252, the second hook 254, and the casing 210 are integrally formed during the injection molding manufacturing process rather than the first hook 252 and the second hook 254 being assembled on the casing 210, so the overall appearance may not be changed by the assembly tolerance after the stylus 220 is inserted.

When the stylus 220 is withdrawn from the casing 210, please refer to FIG. 7 and FIG. 4 in sequence, the stylus 220 disengages from the accommodation groove 212 from the open end 212a along the reverse direction of the first direction D1. The groove 222 on the front edge of the stylus 220 ceases to interfere with the hook 252 and hook 254, and the front edge of the stylus 220 no longer touches the first protruding portion 232 of the annular sleeve 230. At this moment, by the weight and the inclined spiral surface of the annular sleeve 230, the annular sleeve 230 rotates about the center column 214a along the reverse direction of the first direction D1 (i.e. the direction in which the stylus 220 withdraws from the open end 212a), which separates the second protruding portion 234 from the charging switch 240.

Incidentally, when the annular sleeve 230 rotates about the center column 214a along the reverse direction of the first direction D1 by the weight and the inclined spiral surface of the annular sleeve 230, the charging switch 240 supplementally provides the elastic restoring force for pushing the second protruding portion 234, which prompts the annular sleeve 230 to rotate.

To sum up, the electronic device of the disclosure has at least the following advantages compared to the conventional electronic device:

1. The latch structure used in the conventional electronic device is replaced with the annular sleeve having the first protruding portion and the second protruding portion. Since the annular sleeve does not have the elastic arm, the problem of elastic fatigue occurring in the elastic arm of the latch structure is prevented.
2. Since the first hook and the second hook are disposed on the two opposite sides of the accommodation groove, the first hook and the second hook provide a better engaging force to the stylus and prevent the stylus from falling out of the casing when the electronic device performs a drop test.
3. The conventional electronic device has a problem when the strength of the single-sided hook structure and the strength of the elastic arm of the latch structure are different, the uneven forces applied by the hook structure and the latch structure on two sides may cause the stylus to be positioned incorrectly after the stylus is inserted into the accommodation groove. Such a problem can be solved.
4. In contrast to the conventional electronic device in which extra hook components are assembled to the casing, the first hook, the second hook, and the casing, instead, are integrally formed during the injection molding manufacturing process, so the overall appearance is not affected by the assembly tolerance after the stylus 220 is inserted.
5. After the stylus reaches the specified position, the movement and the rotation distance of the first protruding portion is restricted by the stopper portion, and the second protruding portion actually touches and pushes the charging switch to the specified position before triggering the charging schedule, so as to prevent the charging switch from being triggered too early and protect the circuit board from damage due to over-charging.

What is claimed is:

1. An electronic device, comprising:
   a casing, having an accommodation groove and a base, wherein the accommodation groove has an open end, and the base is disposed adjacent to the accommodation groove and has a center column protruding along an axial direction of the base;
   a stylus, adapted to enter from the open end and be accommodated in the accommodation groove, wherein a front edge of the stylus has a groove;
   an annular sleeve, sleeved on the center column and having a first protruding portion and a second protruding portion protruding from a circumferential surface of the annular sleeve, wherein the first protruding portion is located on a movement path of the stylus entering the accommodation groove from the open end until going in thoroughly;
   a charging switch, disposed adjacent to the base, wherein the charging switch and the accommodation groove are located on different sides of the base, and the second protruding portion is adapted to touch the charging switch; and
   a pair of hooks, located on the opposite sides of the accommodation groove and adapted to be fastened with the groove.

2. The electronic device according to claim 1, wherein the stylus enters the accommodation groove from the open end and pushes the first protruding portion for driving the annular sleeve to rotate about the center column along a first direction, and the second protruding portion touches and pushes the charging switch to trigger a charging schedule.

3. The electronic device according to claim 2, wherein the casing further comprises a stopper portion, the stopper portion is located on the movement path of the first protruding portion and adapted to restrict a rotation angle of the annular sleeve.

4. The electronic device according to claim 1, wherein a top surface of the base and a bottom surface of the annular sleeve are spiral surfaces, and the top surface of the base touches the bottom surface of the annular sleeve.

5. The electronic device according to claim 4, wherein the top surface of the base and the bottom surface of the annular sleeve are in partial contact.

6. The electronic device according to claim 4, wherein when the stylus disengages from the accommodation groove from the open end, the groove on the front edge of the stylus ceases to interfere with the pair of hooks, the annular sleeve rotates about the center column along a reverse direction of a first direction by a weight of the annular sleeve to separate the second protruding portion from the charging switch.

7. The electronic device according to claim 6, wherein the charging switch provides an elastic restoring force to move the second protruding portion.

8. The electronic device according to claim 1, wherein the pair of hooks, along the axial direction, is spaced apart from an inner surface of the casing by a distance.

9. The electronic device according to claim 8, wherein the casing has a groove located below one of the hooks disposed adjacent to the base.

* * * * *